(12) United States Patent
Mizuno et al.

(10) Patent No.: US 12,377,548 B2
(45) Date of Patent: Aug. 5, 2025

(54) ROBOT CONTROLLING SYSTEM

(71) Applicant: Sony Interactive Entertainment Inc., Tokyo (JP)

(72) Inventors: Masayoshi Mizuno, Tokyo (JP); Toshiyuki Kurosaki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 435 days.

(21) Appl. No.: 17/423,936

(22) PCT Filed: Jan. 20, 2020

(86) PCT No.: PCT/JP2020/001714
§ 371 (c)(1),
(2) Date: Jul. 19, 2021

(87) PCT Pub. No.: WO2020/153297
PCT Pub. Date: Jul. 30, 2020

(65) Prior Publication Data
US 2022/0080599 A1   Mar. 17, 2022

(30) Foreign Application Priority Data
Jan. 25, 2019   (JP) ................. 2019-011645

(51) Int. Cl.
*B25J 9/00* (2006.01)
*B25J 9/16* (2006.01)
(Continued)

(52) U.S. Cl.
CPC .......... *B25J 9/1697* (2013.01); *B25J 9/0003* (2013.01); *B25J 9/163* (2013.01); *B25J 13/08* (2013.01); *G06V 20/10* (2022.01)

(58) Field of Classification Search
CPC ........ B25J 9/1697; B25J 9/0003; B25J 9/163; B25J 13/08; B25J 9/161; B25J 19/023;
(Continued)

(56) References Cited

U.S. PATENT DOCUMENTS 4,163,183 A * 7/1979 Engelberger ............. F16H 9/10
  318/568.18
4,370,721 A * 1/1983 Berenberg ......... G05B 19/4083
  700/193
(Continued)

FOREIGN PATENT DOCUMENTS

CN   101053953 A   10/2007
CN   104275698 A    1/2015
(Continued)

OTHER PUBLICATIONS

Yu et al, Computer Control System and Walking Pattern Control for a Humanoid Robot, 2008, IEEE, Proceedings of the 2008 IEEE/ASME International Conference on Advanced Intelligent Mechatronics ;Jul. 2-5, 2008, Xi'an, China, pp. 1018-1023 (Year: 2008).*
(Continued)

*Primary Examiner* — Jaime Figueroa
(74) *Attorney, Agent, or Firm* — Kilpatrick Townsend & Stockton LLP

(57) ABSTRACT

A control system 4 includes an application processor that executes a first operating system to process an application, a sensor processor that executes a second operating system to process image data acquired by an image sensor, and a motion controlling processor that executes a third operating system to control motion of a movable part of a robot. The first operating system, the second operating system, and the third operating system are different from each other.

19 Claims, 2 Drawing Sheets

(51) Int. Cl.
    *B25J 13/08*     (2006.01)
    *G06V 20/10*     (2022.01)

(58) Field of Classification Search
    CPC .......... G06V 20/10; G05B 2219/33161; G05B 2219/34021; G05B 2219/34033; G05B 2219/34258; G05B 2219/34338; G05B 2219/39369; G05B 2219/40532; G01B 11/24
    USPC ................. 700/245–264; 318/568.11–568.25
    See application file for complete search history.

(56) References Cited

U.S. PATENT DOCUMENTS

| | | | | |
|---|---|---|---|---|
| 4,543,639 | A * | 9/1985 | Inaba | G05B 19/41825 |
| | | | | 700/249 |
| 4,833,624 | A | 5/1989 | Kuwahara | |
| 4,969,108 | A | 11/1990 | Webb | |
| 5,319,443 | A | 6/1994 | Watanabe | |
| 5,579,444 | A | 11/1996 | Dalziel | |
| 6,442,451 | B1 | 8/2002 | Lapham | |
| 6,584,377 | B2 * | 6/2003 | Saijo | G06N 3/008 |
| | | | | 700/133 |
| 7,076,322 | B2 * | 7/2006 | Chandhoke | G05B 19/416 |
| | | | | 700/180 |
| 7,076,332 | B2 * | 7/2006 | Cifra | G05B 19/414 |
| | | | | 700/245 |
| 7,657,345 | B2 | 2/2010 | Endo | |
| 8,326,460 | B2 | 12/2012 | Katsutoshi | |
| 8,559,699 | B2 * | 10/2013 | Boca | B25J 9/1679 |
| | | | | 382/153 |
| 8,880,221 | B2 * | 11/2014 | Lee | B62D 57/032 |
| | | | | 318/568.22 |
| 9,014,848 | B2 * | 4/2015 | Farlow | B25J 19/023 |
| | | | | 701/25 |
| 9,208,395 | B2 | 12/2015 | Fujiki | |
| 9,278,454 | B2 | 3/2016 | Mimura | |
| 9,306,434 | B2 * | 4/2016 | Ueda | G05B 19/19 |
| 9,517,767 | B1 * | 12/2016 | Kentley | B60Q 1/525 |
| 9,931,753 | B1 | 4/2018 | Rizzi | |
| 10,130,883 | B2 | 11/2018 | Hirata | |
| 10,332,275 | B2 | 6/2019 | Niwayama | |
| 10,410,087 | B2 | 9/2019 | Zagaynov | |
| 10,621,751 | B2 | 4/2020 | Yang | |
| 10,631,941 | B2 | 4/2020 | Hashimoto | |
| 10,796,151 | B2 | 10/2020 | Lukierski | |
| 10,857,672 | B2 | 12/2020 | Lee | |
| 10,881,937 | B2 | 1/2021 | Iwamoto | |
| 10,976,343 | B2 | 4/2021 | Yamashita | |
| 11,300,939 | B2 * | 4/2022 | Pan | G05B 19/0421 |
| 11,314,217 | B2 * | 4/2022 | Pan | G06F 9/541 |
| 11,392,103 | B2 * | 7/2022 | Pan | G05B 19/0426 |
| 11,498,211 | B2 * | 11/2022 | Prisament | G06F 9/54 |
| 2002/0087232 | A1 * | 7/2002 | Lapham | B25J 9/1697 |
| | | | | 700/245 |
| 2003/0139848 | A1 * | 7/2003 | Cifra | G05B 19/414 |
| | | | | 700/245 |
| 2003/0230998 | A1 | 12/2003 | Miyaji | |
| 2004/0122557 | A1 * | 6/2004 | Chandhoke | G05B 19/4103 |
| | | | | 700/245 |
| 2004/0133308 | A1 * | 7/2004 | Kato | G06N 3/008 |
| | | | | 700/258 |
| 2004/0199290 | A1 * | 10/2004 | Stoddard | B25J 9/1669 |
| | | | | 700/248 |
| 2005/0113973 | A1 | 5/2005 | Endo | |
| 2005/0119791 | A1 * | 6/2005 | Nagashima | B25J 9/161 |
| | | | | 700/253 |
| 2005/0232467 | A1 | 10/2005 | Mohri | |
| 2005/0240412 | A1 * | 10/2005 | Fujita | G10L 15/16 |
| | | | | 704/E15.017 |
| 2007/0168082 | A1 * | 7/2007 | Kim | G06F 9/3851 |
| | | | | 700/245 |
| 2009/0254217 | A1 * | 10/2009 | Pack | G06N 3/008 |
| | | | | 700/246 |
| 2010/0092032 | A1 * | 4/2010 | Boca | B25J 9/1697 |
| | | | | 348/222.1 |
| 2011/0218675 | A1 | 9/2011 | Ono | |
| 2011/0288684 | A1 * | 11/2011 | Farlow | B25J 9/1697 |
| | | | | 901/1 |
| 2014/0267123 | A1 | 9/2014 | Ludwig | |
| 2014/0336818 | A1 * | 11/2014 | Posselius | B25J 9/1679 |
| | | | | 700/248 |
| 2015/0012137 | A1 | 1/2015 | Mimura | |
| 2015/0022446 | A1 | 1/2015 | Asplund | |
| 2015/0158182 | A1 * | 6/2015 | Farlow | G05D 1/0011 |
| | | | | 901/1 |
| 2015/0190200 | A1 | 7/2015 | Courtine | |
| 2015/0253757 | A1 * | 9/2015 | Ikeda | G05B 19/41825 |
| | | | | 700/114 |
| 2016/0332075 | A1 | 11/2016 | Hirata | |
| 2017/0017839 | A1 | 1/2017 | Hiramatsu | |
| 2017/0136626 | A1 | 5/2017 | Wang | |
| 2017/0154453 | A1 | 6/2017 | Yasutomi | |
| 2017/0255181 | A1 | 9/2017 | Yamada | |
| 2018/0079076 | A1 * | 3/2018 | Toda | G05B 13/029 |
| 2018/0140923 | A1 | 5/2018 | Iwamoto | |
| 2018/0189565 | A1 | 7/2018 | Lukierski | |
| 2018/0203034 | A1 | 7/2018 | Yamashita | |
| 2018/0222048 | A1 * | 8/2018 | Hasegawa | B25J 9/161 |
| 2018/0229367 | A1 * | 8/2018 | Lee | G06F 9/544 |
| 2018/0243897 | A1 | 8/2018 | Hashimoto | |
| 2018/0281187 | A1 * | 10/2018 | Lee | G06F 9/545 |
| 2018/0304467 | A1 * | 10/2018 | Matsuura | B25J 13/06 |
| 2018/0365853 | A1 | 12/2018 | Yang | |
| 2019/0171210 | A1 | 6/2019 | Passot | |
| 2019/0366558 | A1 | 12/2019 | Gupta | |
| 2020/0241549 | A1 | 7/2020 | Tsurumi | |
| 2021/0283783 | A1 | 9/2021 | Gillett | |
| 2022/0013090 | A1 | 1/2022 | Su | |
| 2022/0080599 | A1 | 3/2022 | Mizuno | |
| 2022/0130066 | A1 | 4/2022 | Mizuno | |
| 2023/0028793 | A1 | 1/2023 | Zhang | |
| 2023/0046365 | A1 | 2/2023 | Wolfe | |
| 2023/0372014 | A1 | 11/2023 | Gao | |

FOREIGN PATENT DOCUMENTS

| | | |
|---|---|---|
| CN | 105917385 A | 8/2016 |
| CN | 107923740 | 4/2018 |
| CN | 108079547 A | 5/2018 |
| CN | 108161931 A | 6/2018 |
| CN | 108369743 A | 8/2018 |
| CN | 108607819 A | 10/2018 |
| CN | 109146965 A | 1/2019 |
| DE | 112018004507 T5 | 6/2020 |
| EP | 0528054 A1 | 2/1993 |
| EP | 2659321 B1 | 5/2015 |
| JP | 62232006 A | 10/1987 |
| JP | 0212504 A | 1/1990 |
| JP | 2012504 A | 1/1990 |
| JP | 5241626 A | 9/1993 |
| JP | 08150581 A | 6/1996 |
| JP | 8202679 A | 8/1996 |
| JP | 2002239952 A | 8/2002 |
| JP | 2003291084 A | 10/2003 |
| JP | 2004201085 A | 7/2004 |
| JP | 2005096068 | 4/2005 |
| JP | 2008183690 A | 8/2008 |
| JP | 2009523623 A | 6/2009 |
| JP | 2009238233 A | 10/2009 |
| JP | 2011201007 A | 10/2011 |
| JP | 2011230257 A | 11/2011 |
| JP | 2013151045 A | 8/2013 |
| JP | 2014505934 A | 3/2014 |
| JP | 2014097572 A | 5/2014 |
| JP | 2015013329 A | 1/2015 |
| JP | 2016063309 A | 4/2016 |
| JP | 2017156242 A | 9/2017 |
| JP | 2018043338 A | 3/2018 |
| JP | 2018126796 A | 8/2018 |
| JP | 2018529175 A | 10/2018 |
| JP | 2018535468 A | 11/2018 |

(56) References Cited

FOREIGN PATENT DOCUMENTS

| KR | 20030073447 A | 9/2003 |
|----|---------------|--------|
| WO | 2015145543 A1 | 10/2015 |
| WO | 2017033355 A1 | 3/2017 |
| WO | 2018159177 A1 | 9/2018 |

OTHER PUBLICATIONS

Tsardoulias et al, Robotic frameworks, architectures and middleware comparison, 2017, arxiv e-prints; Computer Science—Robotics; arXiv:1711.06842 [cs.RO] (or arXiv:1711.06842v1 [cs.RO] for this version) (Year: 2017).*

Semeniuta et al, Event-driven industrial robot control architecture for the Adept V+ platform; Jul. 2019, PeerJ Computer Science, 5: e207 https://doi.org/10.7717/peerj-cs.207 (Year: 2019).*

Andreev, Andrey, et al. "The control system of the eight-legged mobile walking robot." Knowledge-Based Software Engineering: 11th Joint Conference, JCKBSE 2014, Volgograd, Russia, Sep. 17-20, 2014. Proceedings 11. Springer International Publishing, 2014. (Year: 2014).*

Park, Ill-Woo, et al. "Control hardware integration of a biped humanoid robot with an android head." Robotics and Autonomous Systems 56.1 (2008): 95-103. (Year: 2008).*

Moni, Róbert, et al. "Embedded Real-time Implementation of a Computational Efficient Optical Flow Extraction Method for Intelligent Robot Control Applications." AICS. 2016. (Year: 2016).*

Jeppesen, Benjamin P., et al. "An FPGA-based controller for collaborative robotics." 2017 IEEE 26th International Symposium on Industrial Electronics (ISIE). IEEE, 2017. (Year: 2017).*

Jin, Seunghun, et al. "An FPGA-based motion-vision integrated system for real-time machine vision applications." 2009 IEEE International Symposium on Industrial Electronics. IEEE, 2009. (Year: 2009).*

International Search Report for corresponding PCT Application No. PCT/JP2020/001714, 6 pages dated Mar. 17, 2020.

Notice of Reasons for Refusal for related JP Application No. 2019-011646, 6 pages, May 24, 2022.

Extended European Search Report for corresponding EP Application No. 20744626.1, 13 pages dated Sep. 9, 2022.

Zhangguo Yu et al., "Distributed Control System for a Humanoid Robot", Mechatronics and Automation, 2007, ICMA, International Conference on Mechantronics and Automation, pp. 1166-1171, Aug. 5-8, 2007.

Dmitry Kaynov, Tesis Doctoral: "Open Motion Control on Architecture for Humanoid Robots" URL:https://e-archivo.uc3m.es/bitstream/handle/10016/5573/Thesis_Dmitry_Kaynov.pdf?sequence=1, 364 pages, dated Oct. 1, 2008.

Notice of Reasons for Refusal for corresponding JP Application No. 2019-011645, 8 pages, dated Oct. 25, 2022.

Office Action for corresponding JP Application No. 2019-011645, 8 pages, Apr. 12, 2022.

International Preliminary Report on Patentability and Written Opinion for corresponding PCT Application No. PCT/JP2020/001714, 16 pages dated Aug. 5, 2021.

International Preliminary Report on Patentability and Written Opinion for corresponding PCT Application No. PCT/JP2020/001715, 16 pages dated Aug. 5, 2021.

International Search Report for related PCT Application No. PCT/JP2020/001715, 4 pages dated Apr. 7, 2020.

The First Office Action for related CN Application No. 202080009904.4, 18 pages, dated Sep. 1, 2023.

International Search Report for related PCT Application No. PCT/JP2020/001716, 7 pages, dated Mar. 17, 2020.

International Preliminary Report on Patentability and Written Opinion for related PCT Application No. PCT/JP2020/001716, 18 pages, dated Aug. 5, 2021.

Extended European Search Report for related EP Application No. 20744424.1, 11 pages, dated Sep. 9, 2022.

Notice of Reasons for Refusal for related JP Application No. JP2019-011647, 6 pages dated March 27, 2023.

The First Office Action for related CN Application No. 202080009953.8, 16 pages dated Aug. 14, 2023.

Communication pursuant to Article 94(3) EPC, 9 pages, dated Apr. 22, 2025.

A. Andreev et al., "The Control System of the Eight-Legged Mobile Walking Robot", 11th Joint Conference Knowledge-Based Software Engineering, JCKBSE 2014, Volgograd, Russia, Sep. 17-20, 2014, vol. 466, pp. 383-392.

* cited by examiner

ROBOT CONTROLLING SYSTEM

TECHNICAL FIELD

The present invention relates to a system for controlling an action of a robot.

BACKGROUND ART

Conventionally, research and development of various types of robots have been performed. PTL 1 discloses a learning method for walking control by a legged mobile robot of the humanoid type. PTL 1 discloses a method for reinforcement-learning of, when a robot cannot stably walk along a walking trajectory given at an initial stage, a stable walking trajectory along which the robot can walk.

CITATION LIST

Patent Literature

[PTL 1] Japanese Patent Laid-Open No. 2005-96068

SUMMARY

Technical Problem

The robot technology is advancing day by day. Although pet-type robots of the four-legged walking type have been the mainstream of commercial models, in recent years, humanoid robots that perform complicated operations such as dancing are distributed. It is expected that, by increase of an arithmetic operation capacity and improvement of a learning model, a robot itself learns to improve existing functions and acquire new functions.

An action purpose and an action mode of an autonomous robot depend upon an application to be executed. An application for causing a robot to autonomously walk collects and analyzes environmental information around the robot and calculates rotational speeds for a plurality of motors configuring robot joints. A microcomputer for control is provided for each motor, and the plurality of microcomputers supply power according to the calculated rotational speeds to the motors in synchronism with one another. For example, an application that has an action purpose of following a user specifies positions of the user and an obstacle in a space from a camera image, determines a route along which to follow the user, and calculates rotational speeds for the motors of the robot joints such that the robot moves on the route.

In a robot, rotational speeds for a plurality of motors are calculated on the basis of accurate data obtained by image sensing, and the motors are rotated at the calculated rotational speeds without any time delay to implement an action mode according to an action purpose. If a robot is to be provided with an advanced autonomous action function, then the arithmetic operation amount by the application becomes great. However, in order to allow the robot to act even in such a case as just described, it is necessary to build a mechanism for immediately implementing an image sensing function and/or a motion controlling function.

Solution to Problem

In order to solve the problem described above, a robot controlling system of one aspect of the present invention includes an application processor that executes a first operating system to process an application, a sensor processor that executes a second operating system to process image data acquired by an image sensor, and a motion controlling processor that executes a third operating system to control motion of a movable part of a robot. The first operating system, the second operating system, and the third operating system are different from one another.

It is to be noted that also any combination of the constituent elements described above and those of representations of the present invention converted between a method, an apparatus, a system, a computer program, a recording medium in which the computer program is recorded readably, a data structure, and so forth are effective as modes of the present invention.

DESCRIPTION OF EMBODIMENT

Figure 1:
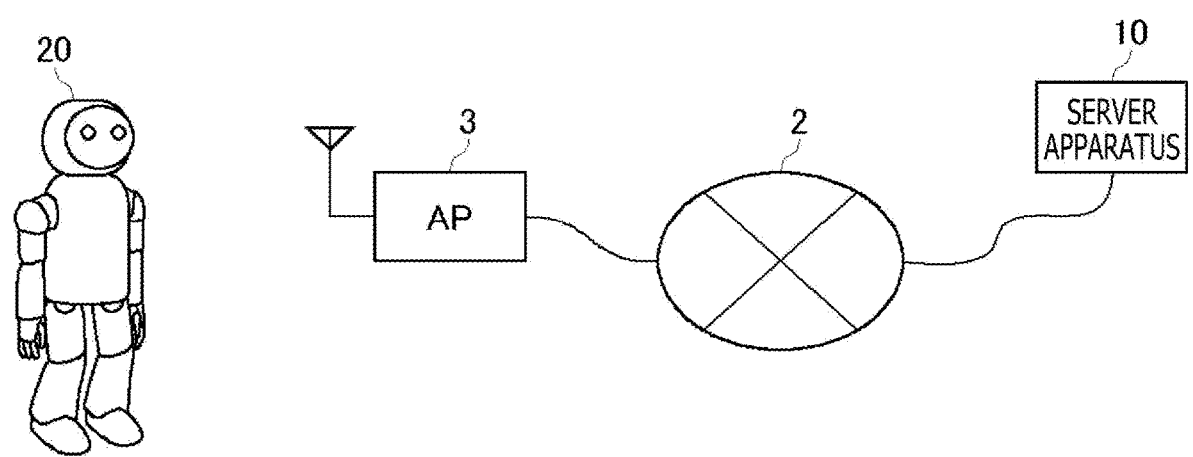
FIG. 1 is a view depicting a general configuration of an entertainment system of an embodiment.

FIG. 1 depicts a general configuration of an entertainment system 1 of an embodiment. The entertainment system 1 includes a robot apparatus 20 and a server apparatus 10. The robot apparatus 20 is a mobile object that can walk autonomously and is connected for communication with the server apparatus 10 via a network 2 such as the Internet through an access point (AP) 3.

The robot apparatus 20 is configured as a humanoid robot and is owned by a user who is an owner. Preferably, the robot apparatus 20 is capable of recognizing the owner by face authentication based on image analysis, voiceprint authentication based on voice analysis, or the like. By recognizing the owner, the robot apparatus 20 can, for example, accept an instruction only from the owner and act according to the owner instruction.

Preferably, the robot apparatus 20 has parts similar to those of a human being and has an external shape that gives a sense of friendliness to human beings. The robot apparatus 20 has a head, a neck, a trunk (a chest, an abdomen, and a back), upper limbs, and lower limbs. The upper limbs may each have an upper arm, a forearm, and a hand, and the lower limbs may each have a thigh, a lower leg, and a foot. The parts are coupled to each other by an actuator. The actuator includes at least a motor arranged at a joint portion that is a movable part and a link mechanism that couples one motor to another motor. The robot apparatus 20 acts according to an action purpose while keeping a balance in posture by driving the actuators.

The robot apparatus 20 implements basic functions including walking and running functions and a function of avoiding an obstacle by a basic application program (hereinafter also referred to as a "basic application") that describes controlling methods for the individual actuators. Since the basic application takes charge of the basic functions of the robot apparatus 20, it is preferably preinstalled in the robot apparatus 20 and may be, for example, incorporated in middleware.

Any application program other than the basic application is an applied application program (hereinafter also referred to as an "applied application"). The applied application implements an additional function such as a dancing function, for example. The applied application is supplied from the server apparatus 10 as occasion demands and is installed into the robot apparatus 20. The robot apparatus 20 acquires a new function by downloading and installing a new applied application.

Figure 2:
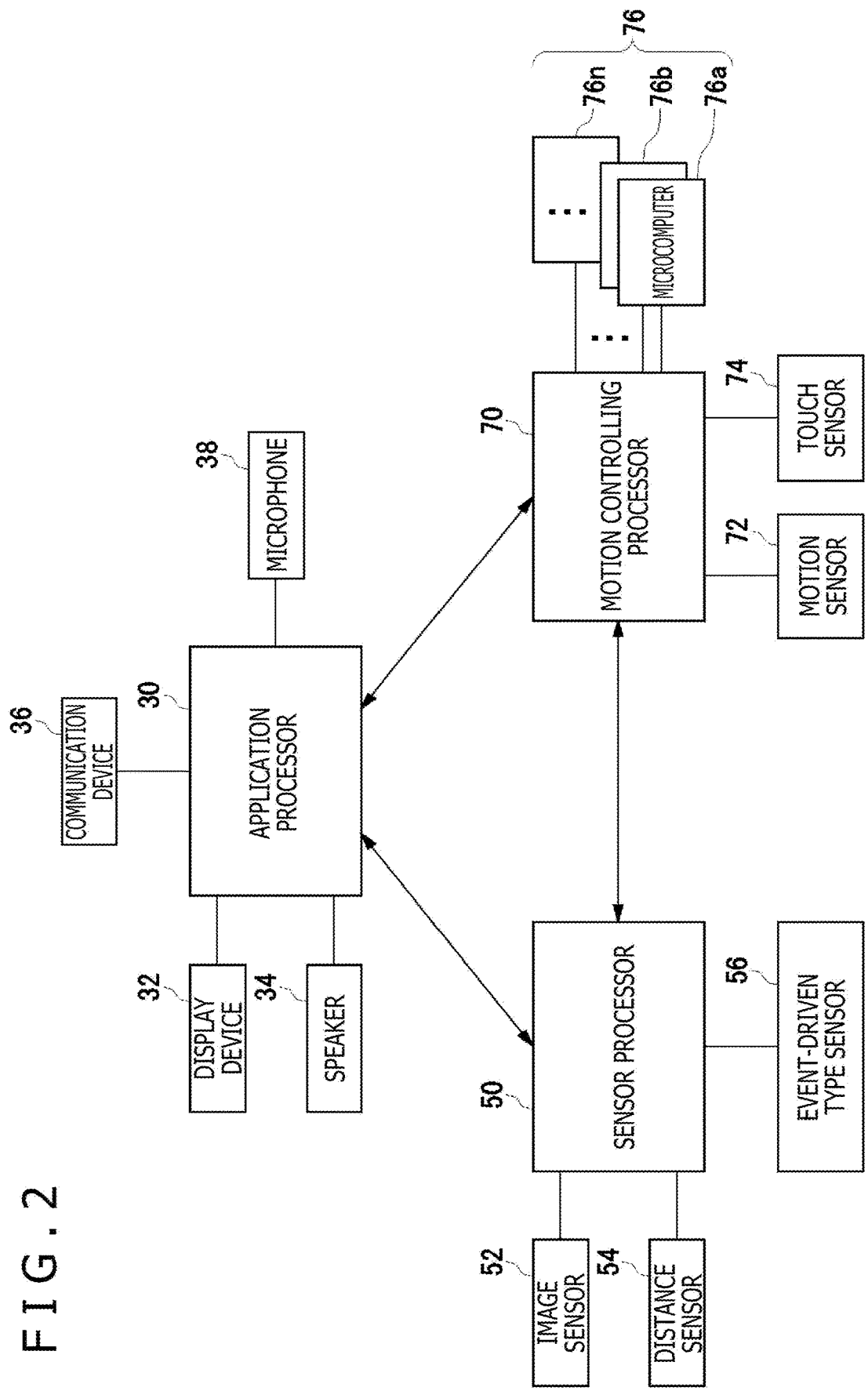
FIG. 2 is a view depicting a hardware configuration of a control system.

FIG. 2 depicts a hardware configuration of a control system 4. The control system 4 of the embodiment includes architecture for implementing immediacy of an image sensing function and a motion controlling function of the robot apparatus 20. The control system 4 has a multiprocessor configuration and includes an application processor 30 for processing an application, a sensor processor 50 for processing image data, and a motion controlling processor 70 for controlling motion of movable parts of the robot apparatus 20. In the control system 4, the application processor 30 and the sensor processor 50 construct an image analysis system, and the application processor 30 and the motion controlling processor 70 construct a motion controlling system. The application processor 30, the sensor processor 50, and the motion controlling processor 70 are provided in a housing of the robot apparatus 20, and two of the processors are connected for communication to each other.

In this architecture, the application processor 30 operates as a main processor. The sensor processor 50 carries out image analysis designated by the application processor 30 and provides an image analysis result to the application processor 30. The motion controlling processor 70 drives and controls the actuators at rotational speeds designated by the application processor 30. Since the sensor processor 50 and the motion controlling processor 70 individually carry out corresponding processes, it is not necessary for the application processor 30 to have the image sensing function and the motion controlling function, and a processing load on the application processor 30 can be reduced.

The application processor 30 executes a first operating system (hereinafter also referred to as a "first OS") to process an application. The application to be processed includes both the basic application and the applied application. While processing a plurality of basic applications simultaneously, the application processor 30 also processes a necessary applied application. Therefore, the application processor 30 incorporates a plurality of central processing unit (CPU) cores therein. Preferably, the first OS is a general-purpose OS that allows various applications to be executed simultaneously.

To the application processor 30, a display device 32, a speaker 34, a communication device 36, and a microphone 38 are connected. The display device 32 and the speaker 34 output an image and sound generated by the application processor 30, respectively, to present information to the user. The communication device 36 establishes connection to the AP 3 by a wireless local area network (LAN) and communicates with the server apparatus 10 through the AP 3. The communication device 36 may have a portable telephone communication function. The communication device 36 can download an applied application and a patch file from the server apparatus 10. The microphone 38 collects ambient sound, converts it into a sound signal, and provides the sound signal to the application processor 30. The application processor 30 may have a sound recognition function such that it determines an action on the basis of a voice instruction by the user.

The sensor processor 50 is a processor that carries out the image sensing function and is connected to an image sensor 52, a distance sensor 54, and an event-driven type sensor 56. The image sensor 52, the distance sensor 54, and the event-driven type sensor 56 are incorporated in the robot apparatus 20 and operate as visual sensors that acquire peripheral information of the robot apparatus 20, and the sensor processor 50 takes charge of a recognition function in terms of vision.

The image sensor 52 is a camera and provides an RGB image captured in a predetermined cycle (for example, 1/60 second) to the sensor processor 50. The distance sensor 54 may be a time-of-flight (TOF) distance image sensor and supplies a three-dimensional distance image to the sensor processor 50. The event-driven type sensor 56 is a sensor that detects a change in luminance value of a pixel of an imaging element and supplies a combination of a time of detection and pixel coordinates to the sensor processor 50. The distance sensor 54 and the event-driven type sensor 56 are information sensors that detect information relating to an imaging target included in image data.

The event-driven type sensor 56 has a dynamic range wider than that of the image sensor 52 and can accurately detect a movement of an imaging target even in an environment in which incident light exceeding the dynamic range of the image sensor 52 exists. Further, since the event-driven type sensor 56 can detect a movement of an imaging target with time resolution higher than that of the image sensor 52, when the sensor processor 50 processes image data acquired by the image sensor 52, it can complementarily utilize the movement information acquired by the event-driven type sensor 56.

The sensor processor 50 executes a second operating system (hereinafter also referred to as a "second OS") to process image data acquired by the image sensor 52. The sensor processor 50 may have a neural network that recognizes a target object included in the image data by using a machine-learned model. The sensor processor 50 acquires depth information of an imaging target from the distance sensor 54 and movement information of the imaging target from the event-driven type sensor 56, and analyzes the image data acquired from the image sensor 52 by using the imaging target information. The application processor 30 designates an image analysis function to be carried out, according to the application to be processed, for the sensor processor 50.

For example, when the application processor 30 processes an application for causing the robot apparatus 20 to follow the owner that is a following target, it requests the sensor processor 50 to specify the position of the owner. Receiving the request, the sensor processor 50 sets a parameter set for image analysis for recognizing the owner from a captured image to the neural network and carries out a process for recognizing the owner by image analysis. It is to be noted that, while the parameter set for owner recognition may be stored in a storage device (not depicted) connected to the sensor processor 50, it may otherwise be supplied from the application processor 30. The sensor processor 50 may execute a process for analyzing image data, taking the imaging target information acquired by the distance sensor 54 and the event-driven type sensor 56 into consideration.

The sensor processor 50 may have a learning function of optimizing the parameter set for the neural network in order to implement the image analysis function specialized for the application. In this example, preferably, the sensor processor 50 carries out learning for optimizing the parameter set for owner recognition in advance and optimizes the parameter set before the application processor 30 carries out the application for following the owner.

An objective function (error function) in the learning function compares an output obtained by inputting an image for learning to the neural network and a correct value corresponding to the image (namely, the fact that a target person is the owner) to calculate an error. The learning function calculates a gradient for a parameter by a gradient back-propagation method or the like on the basis of the error and updates the optimization target parameter of the neural network on the basis of the momentum method. By performing learning specialized for the application, an optimum parameter set can be created for each application, and an accurate image analysis function is implemented. It is to be noted that the sensor processor 50 may have a learning function of a different type.

For example, when the application processor 30 processes an application by which the robot apparatus 20 predicts a destination of a particular moving object and goes to the destination before the object does, the sensor processor 50 predicts a trajectory of movement of the particular object while carrying out image analysis of recognizing the object. Since the event-driven type sensor 56 detects movement information of the imaging target with high time resolution, the movement information can be utilized suitably for accurate movement prediction. The sensor processor 50 predicts a trajectory of movement of the particular object on the basis of information from the image sensor 52, the distance sensor 54, and the event-driven type sensor 56.

Further, when the application processor 30 processes an application by which the robot apparatus 20 performs a movement synchronized with a movement such as a gesture of the owner, the sensor processor 50 may recognize a movement of the owner while carrying out image analysis for recognizing the owner and may further predict a movement in the future. The sensor processor 50 may acquire movement information of the owner detected by the event-driven type sensor 56 to recognize a movement at present of the owner and predict a movement that will be made, on the basis of the movement information obtained so far. If the sensor processor 50 predicts a movement of the owner, then it becomes possible for the robot apparatus 20 to move anticipating a movement of the owner.

The second OS executed by the sensor processor 50 in such a manner as described above preferably is an OS that controls the neural network for image analysis. The second OS is a special OS suitable for the neural network, and accordingly, the second OS is not a general-purpose OS and is different from the first OS.

The motion controlling processor 70 is a processor for controlling motion of movable parts of the robot apparatus 20 and is connected to a plurality of motion sensors 72, a plurality of touch sensors 74, and a plurality of microcomputers 76a to 76n (in the following description, when they are not specifically distinguished from each other, each of them is referred to as a "microcomputer 76"). One microcomputer 76 takes charge of driving of one motor. The motion controlling processor 70 takes charge of a motion controlling function of the robot apparatus 20 and controls the microcomputer 76 to supply driving current to the motor.

Each motion sensor 72 includes a three-axis acceleration sensor and a three-axis gyro sensor. The motion sensor 72 may be provided at each joint portion and provide sensor data indicative of a position and a posture of the joint portion in a three-dimensional space and/or sensor data indicative of a change in position and posture to the motion controlling processor 70. It is to be noted that, in the embodiment, the motion sensor 72 may be provided at the position of the image sensor 52 such that sensor data indicative of a position and a posture of the image sensor 52 in the three-dimensional space and/or sensor data indicative of a change in position and posture is provided to the motion controlling processor 70. Each touch sensor 74 is provided on an outer surface of the robot apparatus 20 and detects contact with the robot apparatus 20.

The motion controlling processor 70 executes a third operating system (hereinafter also referred to as a "third OS") to control motion of a movable part of the robot apparatus 20, namely, rotation of a motor. The role of the motion controlling processor 70 is to manage the microcomputer 76 on a real-time basis such that each motor rotates at a rotational speed calculated by the application processor 30, and its further important role is to prevent fall of the robot apparatus 20. To this end, as a premise to satisfy a motion request from the application processor 30, the motion controlling processor 70 normally monitors sensor data of the motion sensor 72 and carries out a posture controlling application for fall prevention. For example, when the robot apparatus 20 hits an obstacle and is about to fall, the motion controlling processor 70 immediately executes motor control for fall prevention.

In this manner, immediacy is required for motor control by the motion controlling processor 70. Therefore, the third OS executed by the motion controlling processor 70 preferably is a real-time OS. The real-time OS is an OS that is designed such that a particular application such as a posture controlling application is executed at a timing with high accuracy and can perform real-time processing of the application. Naturally, the third OS is different from both the first OS and the second OS.

The application processor 30, the sensor processor 50, and the motion controlling processor 70 are configured in such a manner as described above. For example, when an application for causing the robot apparatus 20 to follow the owner who is a following target is to be executed, it is necessary for the application processor 30 to find the position of the owner in the space and the position in the space of an obstacle existing between the robot apparatus 20 and the owner. Therefore, the application processor 30 instructs the sensor processor 50 to specify the positions of the owner and an obstacle included in image data of the image sensor 52. In the following description, each of the owner and an obstacle that become recognition targets of the application processor 30 is simply referred to as a "target."

The sensor processor 50 acquires image data from the image sensor 52 and carries out image analysis designated by the application processor 30, by using depth information of the distance sensor 54 and movement information of the event-driven type sensor 56. The sensor processor 50 provides the application processor 30 with an image analysis result including position coordinates of each target in a camera coordinate system having the origin at the image sensor 52. This image analysis result also includes depth information (distance information) of the target in the camera coordinate system. Accordingly, the application processor 30 can specify three-dimensional coordinates of the target in the camera coordinate system having the origin at the image sensor 52.

The motion controlling processor 70 provides posture information for specifying the orientation of the image sensor 52 to the sensor processor 50. This posture information may include information for specifying the position of the image sensor 52. In short, the posture information includes information for specifying the orientation and the position of an optical axis in the space when the image sensor 52 acquires the image data. The position of each of the joint portions and the main parts in the robot apparatus 20 is defined by a robot coordinate system in which the origin is a reference position in the robot machine body. The motion controlling processor 70 constantly calculates three-dimensional coordinates of the reference position in a three-dimensional actual space coordinate system (space coordinate system), and creates posture information for specifying the orientation and the position of the image sensor 52 in the space coordinate system by specifying the orientation and the position of the image sensor 52 in the robot coordinate system. The sensor processor 50 transmits the image analysis result to the application processor 30 together with the posture information of the image sensor 52.

The application processor 30 specifies the orientation and the position of the image sensor 52 in the space coordinate system by acquiring the posture information and specifies the three-dimensional coordinates of the image sensor 52 in the camera coordinate system by acquiring the image analysis result. The application processor 30 thereby acquires the three-dimensional coordinates of the target in the space coordinate system.

The motion controlling processor 70 provides the posture information obtained when the image data to be analyzed by the sensor processor 50 is acquired by the image sensor 52 to the sensor processor 50. The motion controlling processor 70 may derive the posture information of the image sensor 52 from the sensor data of the motion sensor 72 provided at each joint portion. It is to be noted that, when a motion sensor 72 is provided at the installation position of the image sensor 52, the motion controlling processor 70 may derive the posture information of the image sensor 52 by using sensor data of the motion sensor 72.

The sensor processor 50 notifies the motion controlling processor 70 of an image capture time of the image data to be used for analysis, and the motion controlling processor 70 provides the posture information of the image sensor 52 at a time same as the image capture time to the sensor processor 50. The motion controlling processor 70 constantly carries out the posture controlling application and calculates position coordinates of the joint portions and the main parts in a sampling cycle much shorter than the image analysis cycle (for example, 1/60 second) of the sensor processor 50. The motion controlling processor 70 in the embodiment may derive the posture information of the image sensor 52 in this sampling cycle and store the posture information into a storage device (not depicted) together with the time information such that, when it receives a notification of an image capture time of image data, it reads out the posture information of the image sensor 52 at a time same as the image capture time from the storage device and provides the posture information to the sensor processor 50.

The sensor processor 50 is provided with posture information from the motion controlling processor 70 during analysis of the image data. When the sensor processor 50 ends the analysis of the image data, it adds the posture information of the image sensor 52 as metadata to the image analysis result and provides the resulting image analysis result to the application processor 30. The application processor 30 specifies the position of the target in the space from the image analysis result and the posture information.

The motion controlling processor 70 in the embodiment provides the posture information of the image sensor 52 to the sensor processor 50, not via the application processor 30. In short, the motion controlling processor 70 directly provides the posture information to the sensor processor 50 through a bus that connects the motion controlling processor 70 and the sensor processor 50 to each other.

In ordinary architecture design, since the application processor 30 that is a main processor relays data transmission between other processors, a data transmission time is a sum additionally including a relay time by the application processor 30. On the other hand, since, in the control system 4, the sensor processor 50 and the motion controlling processor 70 are connected to each other by the bus, when the motion controlling processor 70 provides posture information of the image sensor 52 to the sensor processor 50, directly providing the posture information to the sensor processor 50 achieves shorter transmission time as compared to transmitting the posture information via the application server 30. Therefore, in order to increase the real-time property, the motion controlling processor 70 transmits the posture information of the image sensor 52 directly to the sensor processor 50.

At the time of image analysis, the sensor processor 50 may issue a request for provision of posture information of the image sensor 52, to the motion controlling processor 70. At this time, the sensor processor 50 may notify the motion controlling processor 70 of the image capture time of the image data to be used in the analysis. When the motion controlling processor 70 receives the request for provision of posture information, it provides the posture information of the image sensor 52 directly to the sensor processor 50. When the motion controlling processor 70 is notified of the image capture time of the image data, it may thereafter provide posture information cyclically according to the image analysis cycle of the sensor processor 50. For example, when the image analysis cycle of the sensor processor 50 is 1/60 second, the motion controlling processor 70 may provide posture information to the sensor processor 50 in the same cycle from a start point set at this notified image capture time. It is to be noted that the motion controlling processor 70 may otherwise provide posture information cyclically to the sensor processor 50 without depending upon the request from the sensor processor 50.

The sensor processor 50 adds the posture information as metadata to the image analysis result and provides the resulting image analysis result to the application processor 30. Consequently, the application processor 30 can specify the position of the target in the space. It is to be noted that, although the sensor processor 50 provides the image analysis result, it does not provide the image data used in the image analysis to the application processor 30. In the control system 4, the fact that the sensor processor 50 does not provide image data to the application processor 30 decreases a transmission delay risk from the sensor processor 50 to the application processor 30, so that the image analysis result is provided to the application processor 30 without a time delay. Further, the fact that the sensor processor 50 does not provide image data to the application processor 30 prevents such a situation that image data including personal information leaks to the outside of the robot apparatus 20.

It is to be noted that the sensor processor 50 may otherwise provide the image analysis result to the motion controlling processor 70. For example, when the motion controlling processor 70 has a tracking function of a predetermined target, it may control an autonomous tracking action by using the image analysis result by the sensor processor 50.

As described above, in the control system 4, the sensor processor 50 and the motion controlling processor 70 are provided to avoid a situation that the load is concentrated on the application processor 30. Further, since each of the application processor 30, the sensor processor 50, and the motion controlling processor 70 executes an OS suitable for the corresponding process, the immediacy of the control system 4 as a whole is improved.

The present invention has been described on the basis of the embodiment. The embodiment is exemplary, and it is understood by those skilled in the art that various modifications are possible in regard to the combination of the components and the processes and that also such modifications fall within the scope of the present invention. It is sufficient if the robot apparatus 20 is a movable robot, and the robot apparatus 20 is not limited to a two-legged walking robot. Further, the robot apparatus 20 may be an industrial robot or the like.

Although, in the embodiment, the motion controlling processor 70 provides posture information of the image sensor 52 to the sensor processor 50, it may otherwise provide the posture information to the application processor 30. At this time, the application processor 30 holds the posture information without transferring it to the sensor processor 50 and links the posture information to an image analysis result provided from the sensor processor 50. The application processor 30 refers to an image capture time of image data used in image analysis and included in the image analysis result and an acquisition time of sensor data used in derivation of the posture information and included in the posture information, to link the image analysis result and the posture information at the same timing to each other, and utilizes them for specification of the position of a target in a space.

In the embodiment, an example has been described in which the application processor 30, the sensor processor 50, and the motion controlling processor 70 are provided in the housing of the robot apparatus 20. In a modification, the sensor processor 50 and the motion controlling processor 70 may be provided in the housing of the robot apparatus 20 while the application processor 30 is provided outside the housing of the robot apparatus 20. By providing the function of the application processor 30 outside the robot apparatus 20, for example, in the server apparatus 10, it is possible to provide a high processing capacity to the application processor 30 and cause the application processor 30 to perform a complicated arithmetic operation process.

Although, in the embodiment, it is described that the sensor processor 50 does not provide image data to the application processor 30, if the user sets a predetermined operation mode, then it may be made possible for the sensor processor 50 to provide image data.

While a main power supply to the robot apparatus 20 is off, the event-driven type sensor 56, the motion sensor 72, and the touch sensor 74 may be driven by using standby power. The robot apparatus 20 may be configured such that, when at least one of the event-driven type sensor 56, the motion sensor 72, and the touch sensor 74 detects predetermined information, the main power supply is automatically turned on.

INDUSTRIAL APPLICABILITY

The present invention can be utilized in a system for controlling an action of a robot.

REFERENCE SIGNS LIST

1: Entertainment system
2: Network
3: AP
4: Control system
10: Server apparatus
20: Robot apparatus
30: Application processor
32: Display device
34: Speaker
36: Communication device
38: Microphone
50: Sensor processor
52: Image sensor
54: Distance sensor
56: Event-driven type sensor
70: Motion controlling processor
72: Motion sensor
74: Touch sensor
76: Microcomputer

The invention claimed is:

1. A system for controlling a robot, the system comprising:
an application processor that executes a first operating system to process an application;
a sensor processor that executes a second operating system to generate an image analysis result by processing image data acquired by an image sensor; and
a motion controlling processor that executes a third operating system to control motion of a movable part of the robot, wherein:
the first operating system, the second operating system, and the third operating system are different from one another,
at least two of the application processor, the sensor processor, or the motion controlling processor are provided inside a housing of the robot, and
the sensor processor is configured to: i. obtain posture information of the image sensor from the motion controlling processor; ii. add the posture information as metadata to the image analysis result; and iii. provide the image analysis result including the metadata to the application processor.

2. The system according to claim 1, wherein the second operating system is an operating system that controls a neural network for image analysis, and the third operating system is a real-time operating system.

3. The system according to claim 1, wherein the application processor designates an image analysis function to be carried out, according to the application to be processed, for the sensor processor.

4. The system according to claim 1, wherein the application processor is communicatively coupled to the sensor processor and the motion controlling processor, and wherein the sensor processor is communicatively coupled to the motion controlling processor.

5. The system according to claim 1, wherein the sensor processor is connected to the image sensor, and the motion controlling processor is connected to a motion sensor and is configured to derive posture information for specifying an orientation of the image sensor.

6. The system according to claim 1, wherein the sensor processor is connected to the image sensor and a distance sensor.

7. The system according to claim 1, wherein the sensor processor is connected to the image sensor and an event-driven type sensor.

8. The system according to claim 1, wherein the sensor processor has a learning function of optimizing a parameter set of a neural network that implements an image analysis function.

9. The system according to claim 1, wherein the sensor processor sets a parameter set for image analysis to a neural network to implement an image analysis function, and the parameter set is provided by the application processor.

10. The system according to claim 1, wherein the sensor processor and the motion controlling processor are provided inside the housing while the application processor is provided outside the housing.

11. A system for controlling a robot, the system comprising:
an application processor that executes a first operating system to process an application;
a sensor processor that executes a second operating system to generate an image analysis result by processing image data acquired by an image sensor; and
a motion controlling processor that executes a third operating system to control motion of a movable part of the robot, wherein:
the first operating system, the second operating system, and the third operating system are different from one another,
the sensor processor sets a parameter set for image analysis to a neural network to implement an image analysis function, fH16:
the parameter set is provided by the application processor,
the application processor, the sensor processor, and the motion controlling processor are provided inside a housing of the robot, and
the sensor processor is configured to: i. obtain posture information of the image sensor from the motion controlling processor; ii. add the posture information as metadata to the image analysis result; and iii. provide the image analysis result including the metadata to the application processor.

12. The system according to claim 11, wherein:
the second operating system is an operating system that controls a neural network for image analysis, and
the third operating system is a real-time operating system.

13. The system according to claim 11, wherein the application processor designates an image analysis function to be carried out, according to the application to be processed, for the sensor processor.

14. The system according to claim 11, wherein the application processor is communicatively coupled to the sensor processor and the motion controlling processor, and wherein the sensor processor is communicatively coupled to the motion controlling processor.

15. The system according to claim 1, wherein:
the sensor processor is connected to the image sensor, and
the motion controlling processor is connected to a motion sensor so as to derive posture information for specifying an orientation of the image sensor.

16. The system according to claim 11, wherein the sensor processor is connected to the image sensor and a distance sensor.

17. The system according to claim 11, wherein the sensor processor is connected to the image sensor and an event-driven type sensor.

18. The system according to claim 11, wherein the sensor processor has a learning function of optimizing a parameter set of a neural network that implements an image analysis function.

19. A method for controlling a robot, the method comprising:
executing, on an application processor, a first operating system to process an application;
executing, on a sensor processor coupled to the application processor, a second operating system to generate an image analysis result by processing image data acquired by an image sensor coupled to the sensor processor;
executing, on a motion controlling processor coupled to the application processor and the sensor processor, a third operating system to control motion of a movable part of a robot;
obtaining, by the sensor processor, posture information of the image sensor from the motion controlling processor;
adding, by the sensor processor, the posture information as metadata to the image analysis result; and
providing, by the sensor processor, the image analysis result including the metadata to the application processor.

* * * * *